US006886882B2

(12) United States Patent
Farlow et al.

(10) Patent No.: US 6,886,882 B2
(45) Date of Patent: May 3, 2005

(54) CAB EXTENDER ASSEMBLY METHOD AND APPARATUS

(75) Inventors: John Randolph Farlow, Seattle, WA (US); Robert Marshall Grimm, Port Townsend, WA (US); Gerald Eugene Miller, Kirkland, WA (US); Diana Weyna Smith, Pacific, WA (US); Timothy Michael Stapleton, Renton, WA (US); David C. Warren, Sammamish, WA (US); Alec C. Wong, Bellevue, WA (US); Wayne K. Simons, Kent, WA (US)

(73) Assignee: PACCAR Inc, Bellevue, WA (US)

( * ) Notice: Subject to any disclaimer, the term of this patent is extended or adjusted under 35 U.S.C. 154(b) by 27 days.

(21) Appl. No.: 10/456,787

(22) Filed: Jun. 6, 2003

(65) Prior Publication Data

US 2003/0227194 A1 Dec. 11, 2003

Related U.S. Application Data

(60) Provisional application No. 60/386,902, filed on Jun. 6, 2002.

(51) Int. Cl.⁷ .......................... B60T 1/16; B62D 35/00
(52) U.S. Cl. ............................. 296/180.4; 296/180.1; 296/180.5
(58) Field of Search .................. 296/180.1–180.5; 105/1.1–1.3; D12/93, 94, 102, 181

(56) References Cited

U.S. PATENT DOCUMENTS

| | | |
|---|---|---|
| 3,711,146 A | 1/1973 | Madzsar et al. |
| 3,834,752 A | 9/1974 | Cook et al. |
| 3,945,677 A | 3/1976 | Servais et al. |
| 3,951,445 A | 4/1976 | Tatom |
| 4,102,548 A | 7/1978 | Kangas |
| 4,311,334 A | 1/1982 | Jenkins |
| 4,611,796 A | 9/1986 | Orr |
| 4,685,715 A | 8/1987 | Hardin |
| 4,693,506 A | 9/1987 | Massengill |
| 4,775,179 A * | 10/1988 | Riggs ....................... 296/180.2 |
| 4,824,165 A * | 4/1989 | Fry ......................... 296/180.3 |
| 4,883,307 A | 11/1989 | Hacker et al. |
| 4,904,015 A * | 2/1990 | Haines ..................... 296/180.3 |
| 5,078,448 A * | 1/1992 | Selzer et al. .............. 296/180.2 |

(Continued)

OTHER PUBLICATIONS

Munson, B.R., et al., *Fundamentals of Fluid Mechanics*, 3rd ed., John Wiley & Sons, Inc., New York, 1998, pp. 552–625.
Society of Automotive Engineers International. *Surface Vehicle Recommended Practice: J1708 and J1587*, issued 1986, revised 1993.

*Primary Examiner*—D. Glenn Dayoan
*Assistant Examiner*—Greg Blankenship
(74) *Attorney, Agent, or Firm*—Christensen O'Connor Johnson Kindness PLLC

(57) ABSTRACT

A cab extender assembly (200) for selectively manipulating an aerodynamic drag of a vehicle (100) is provided. The cab extender assembly includes a dynamic cab extender (206a) and a control system (208) coupled to the dynamic cab extender. The control system is adapted to selectively position the dynamic cab extender between a stowed position, a deployed position in which the dynamic cab extender is substantially aligned with a side of the vehicle, and a braking position in which the dynamic cab extender is at least partially disposed into an airstream passing along the side of the vehicle to increase a drag coefficient of the vehicle. The cab extender assembly may also include a fixed cab extender (204a) substantially aligned with the dynamic cab extender when the dynamic cab extender is in the deployed position. A method of operating a cab extender assembly is also disclosed.

36 Claims, 9 Drawing Sheets

U.S. PATENT DOCUMENTS

| | | | | |
|---|---|---|---|---|
| 5,092,648 A | * | 3/1992 | Spears | 296/180.3 |
| 5,190,342 A | | 3/1993 | Marlowe et al. | |
| 5,522,637 A | * | 6/1996 | Spears | 296/180.3 |
| 5,536,062 A | | 7/1996 | Spears | |
| 5,595,419 A | | 1/1997 | Spears | |
| 5,653,493 A | | 8/1997 | Spears | |
| 5,876,088 A | * | 3/1999 | Spears | 296/180.5 |
| 6,079,769 A | * | 6/2000 | Fannin et al. | 296/180.1 |
| 6,099,069 A | * | 8/2000 | Spears | 296/180.2 |
| 6,264,144 B1 | | 7/2001 | Thornton | |
| 6,338,524 B1 | | 1/2002 | Wu | |
| 6,428,084 B1 | * | 8/2002 | Liss | 296/180.3 |

* cited by examiner

CAB EXTENDER ASSEMBLY METHOD AND APPARATUS

CROSS-REFERENCE TO RELATED APPLICATION

This application claims the benefit of U.S. Provisional Patent Application Ser. No. 60/386,902, filed on Jun. 6, 2002, priority from the filing date of which is hereby claimed under 35 U.S.C. §119 and the disclosure of which is hereby expressly incorporated by reference.

FIELD OF THE INVENTION

The invention relates generally to cab extenders and more particularly to cab extenders adapted to selectively control the aerodynamic properties of a vehicle.

BACKGROUND OF THE INVENTION

Aerodynamic drag accounts for over 50% of a tractor trailer truck's total fuel consumption at highway speeds above 55 mph. A gap exits between the tractor and trailer which tends to trap air, creating a low-pressure wake behind the tractor, resulting in a net pressure difference and, therefore, creating drag. One solution has been to use fixed cab extenders to reduce the effect of unwanted drag. Ideally, the fixed cab extenders would extend across the entire gap between the tractor and trailer, which typically varies from 36 to 48 inches, to obtain maximum aerodynamic efficiency. However, if the fixed cab extenders were configured as described, as the tractor turned relative to the trailer, a front end of the trailer would impact and damage the fixed cab extenders.

Therefore, previously developed fixed cab extenders are positioned to have a large clearance space between a vertical trailing edge of the cab extender and the front end of the trailer. This clearance space is required to prevent the front surface of the trailer from impacting the fixed cab extenders during sharp, typically slow speed turns. Thus, there exists a need for a cab extender that may be selectively deployed within the clearance space to cover the space between the tractor and trailer at high speeds to improve fuel economy, and retracted at low speeds to allow the tractor trailer truck to maneuver.

Although fixed cab extenders have proven effective for decreasing the aerodynamic drag encountered by the tractor trailer truck, there are drawbacks to these improvements. For instance, a decrease in the aerodynamic drag of the truck causes a corresponding increase in the braking distance of the truck. This is especially true when the truck is operating at high altitudes where the air is less dense, and therefore provides a decreased stopping force, and where steep grades and brake fade are common. Therefore, there exists a need for a cab extender that may be selectively deployed into a decreased aerodynamic position to aid in stopping the vehicle during braking events.

U.S. Pat. No. 4,824,165 issued to Fry (hereinafter "Fry") discloses one apparatus that attempts to fulfill the need for a cab extender that may be selectively deployed into a decreased aerodynamic position to aid in stopping a vehicle. Although somewhat effective, the apparatus of Fry is not without its problems. Referring to FIG. 3 of Fry, the braking actuators 44 are coupled to the wings 40 such that the braking actuators 44 bear substantially the full braking load exerted upon the wings 40. Thus, the braking actuators must be of substantial size and weight to withstand the braking load, leading to increased equipment costs and a decrease in fuel efficiency due to the increased weight of the braking actuators. Further, the wings 40 are not configurable into a stowed position to impede the wings 40 from being damaged during sharp turns. Therefore, the wings 40 must be of a reduced width such that when the tractor turns, the front end of the trailer does not impact the wings 40. Thus, as best seen in FIG. 4, a large clearance gap exists between the trailing edges of the wings 40 and the front end of the trailer 60. This large clearance gap significantly reduces the aerodynamic efficiency of the vehicle.

SUMMARY OF THE INVENTION

One embodiment of a cab extender assembly formed in accordance with the present invention for selectively manipulating an aerodynamic drag of a vehicle is provided. The cab extender assembly includes a dynamic cab extender. A control system is coupled to the dynamic cab extender and adapted to selectively position the dynamic cab extender between a stowed position, a deployed position, and a braking position. In the deployed position, the dynamic cab extender is substantially aligned with a side of the vehicle. In the braking position, the dynamic cab extender is at least partially disposed into an airstream passing along the side of the vehicle to increase a drag coefficient of the vehicle.

Another embodiment of a cab extender assembly formed in accordance with the present invention for selectively manipulating an aerodynamic drag of a vehicle including a tractor coupled to a trailer is provided. The cab extender assembly includes a fixed cab extender adapted to couple to the tractor so as to extend longitudinally a selected distance in a gap extending substantially along a side of the vehicle between a back end of the tractor and a front end of the trailer. The cab extender assembly further includes a dynamic cab extender coupled to the tractor. A control system is coupled to the dynamic cab extender and adapted to selectively position the dynamic cab extender between a stowed position and a deployed position. In the deployed position, the dynamic cab extender is disposed in the gap so as to be substantially coplanar with the fixed cab extender.

Still another embodiment of a cab extender assembly formed in accordance with the present invention for selectively manipulating an aerodynamic drag of a vehicle including a tractor coupled to a trailer is provided. The cab extender assembly includes a fixed cab extender adapted to couple to the tractor so to extend longitudinally a selected distance in a gap extending substantially along a side of the vehicle between a back end of the tractor and a front end of the trailer. The cab extender assembly further includes a dynamic cab extender adapted to couple to the tractor. A control system is coupled to the dynamic cab extender and operable to selectively position the dynamic cab extender between a deployed position and a braking position. In the deployed position, the dynamic cab extender is disposed in the gap and substantially coplanar with the fixed cab extender. In the braking position, the dynamic cab extender is at least partially disposed into an airstream passing along the side of the vehicle to increase a drag coefficient of the vehicle.

One embodiment of a method performed in accordance with the present invention for selectively manipulating an aerodynamic drag of a vehicle having a dynamic cab extender disposed in a gap located along a side of the vehicle between a tractor and a trailer of the vehicle is provided. The method includes determining a speed of the vehicle and automatically deploying the dynamic cab extender into a deployed position in the gap when the speed of the vehicle exceeds a selected speed. The method further includes automatically stowing the dynamic cab extender in a stowed position when the speed of the vehicle is less than a predetermined speed.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

FIGS. 1-8 depict one embodiment of a cab extender assembly 200 formed in accordance with the present invention. Although the illustrated embodiment of the cab extender assembly 200 is described as implemented in conjunction with a vehicle 100 having a tractor 102 coupled to a trailer 104, those skilled in the relevant art will appreciate that the disclosed cab extender assembly 200 is illustrative in nature and should not be construed as limited to application with a vehicle having a tractor and a trailer. It should therefore be apparent that the cab extender assembly 200 has wide application, and may be used in any situation wherein selectively manipulating the drag of any type of vehicle is desired.

Figure 1:
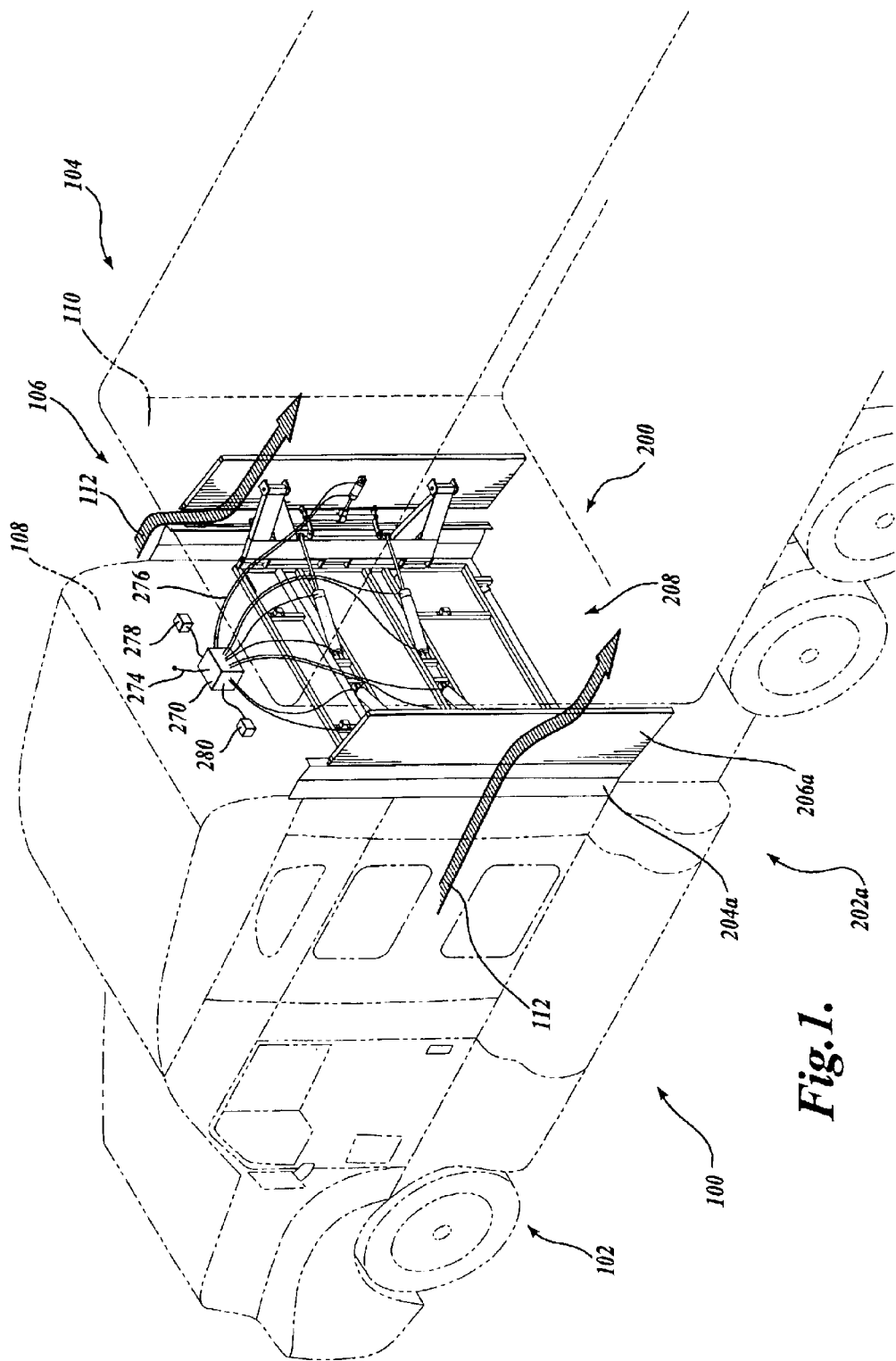
FIG. 1 is an isometric view of one embodiment of a cab extender assembly formed in accordance with the present invention and coupled to a vehicle having a tractor and a trailer, the cab extender assembly including a first dynamic cab extender shown in a deployed position, a second dynamic cab extender show in a braking position, a pair of fixed cab extenders, and a control system for selectively actuating the first and second dynamic cab extenders between stowed deployed and braking positions.
Figure 2:
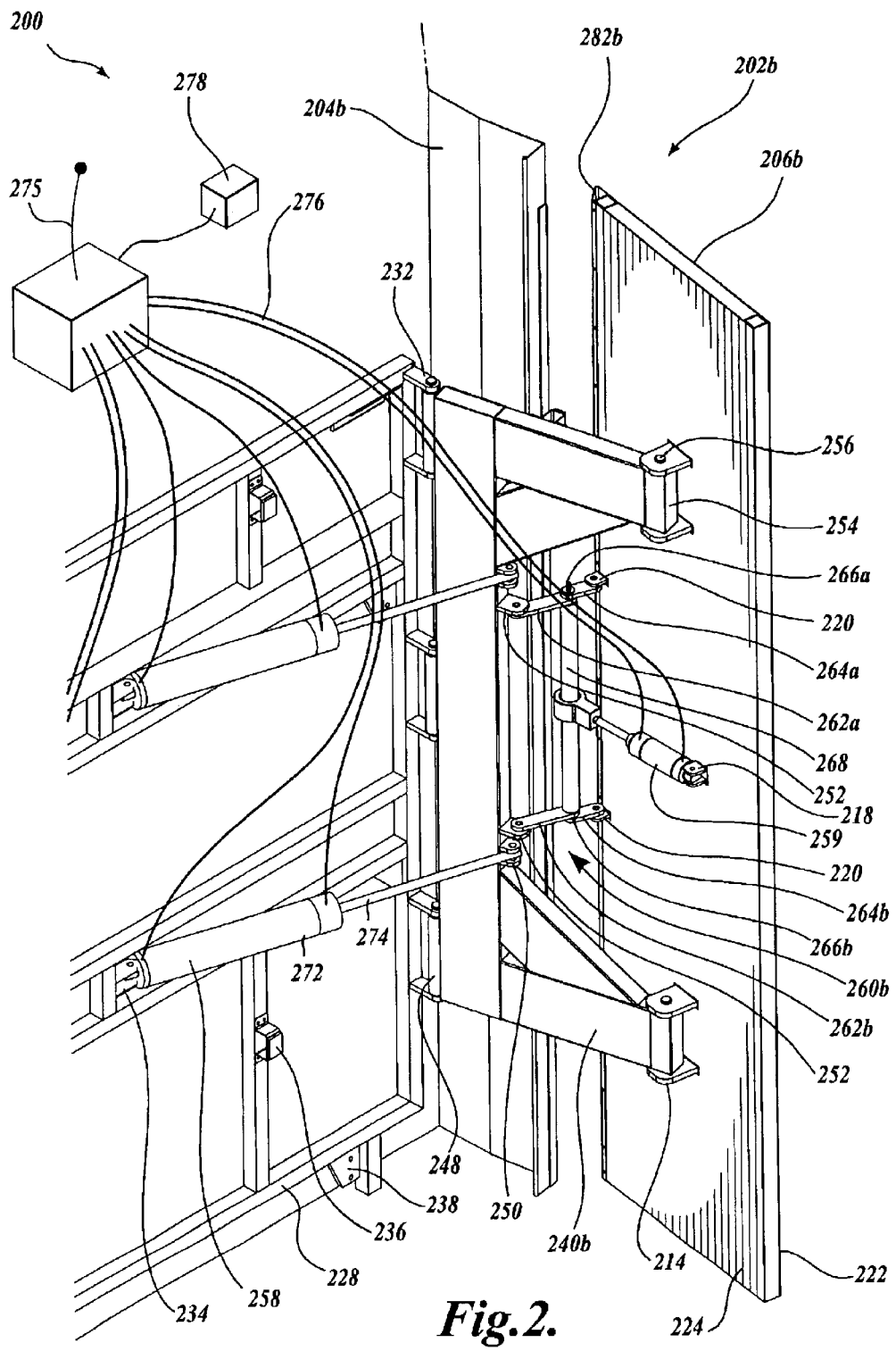
FIG. 2 is a detail isometric view of the cab extender assembly of FIG. 1 depicting the second dynamic cab extender in the braking position.
Figure 4:
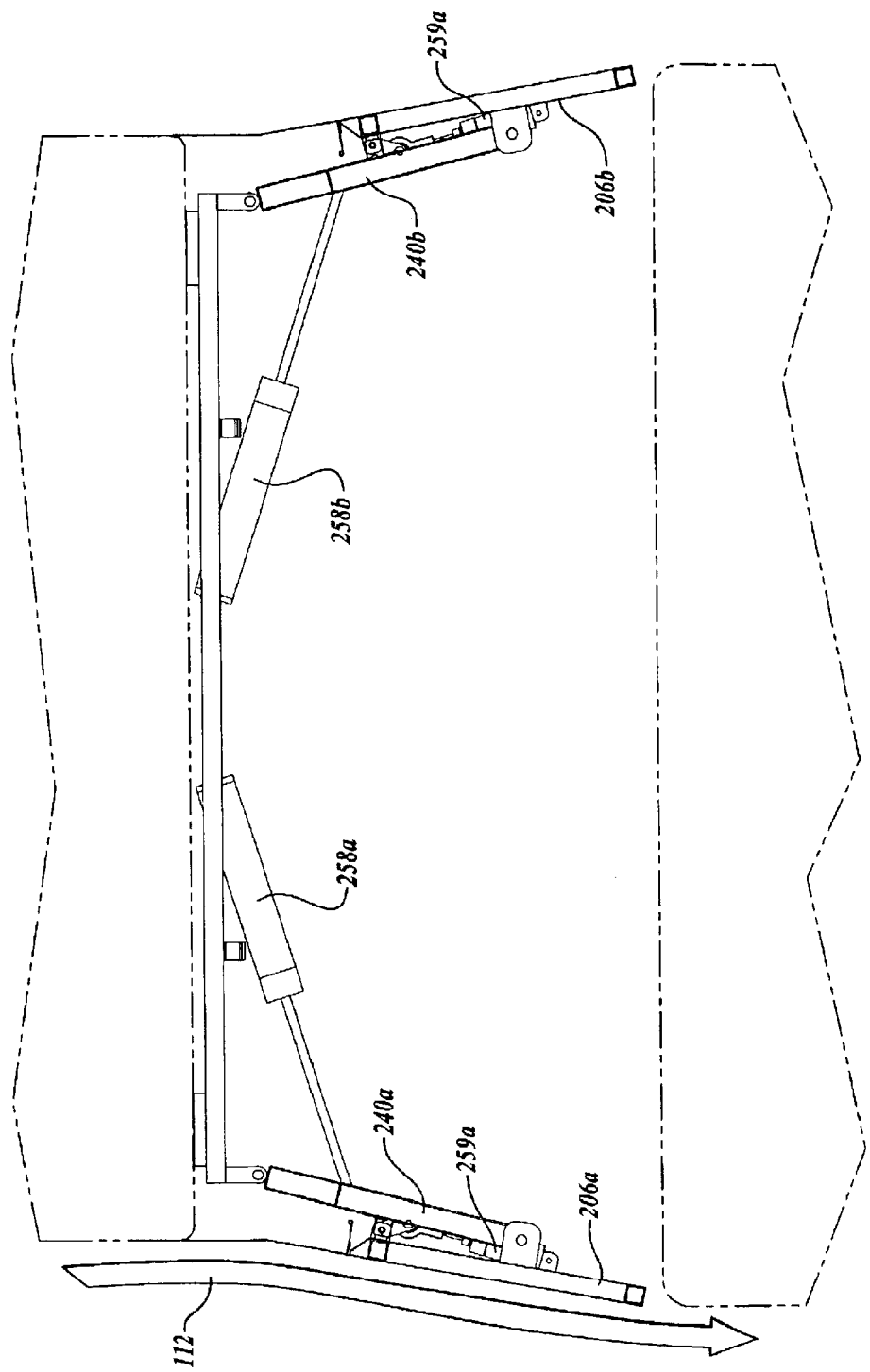
FIG. 4 is a top view of the cab extender assembly and vehicle depicted in FIG. 1 wherein the first and second dynamic cab extenders are each depicted in the deployed position.
Figure 5:
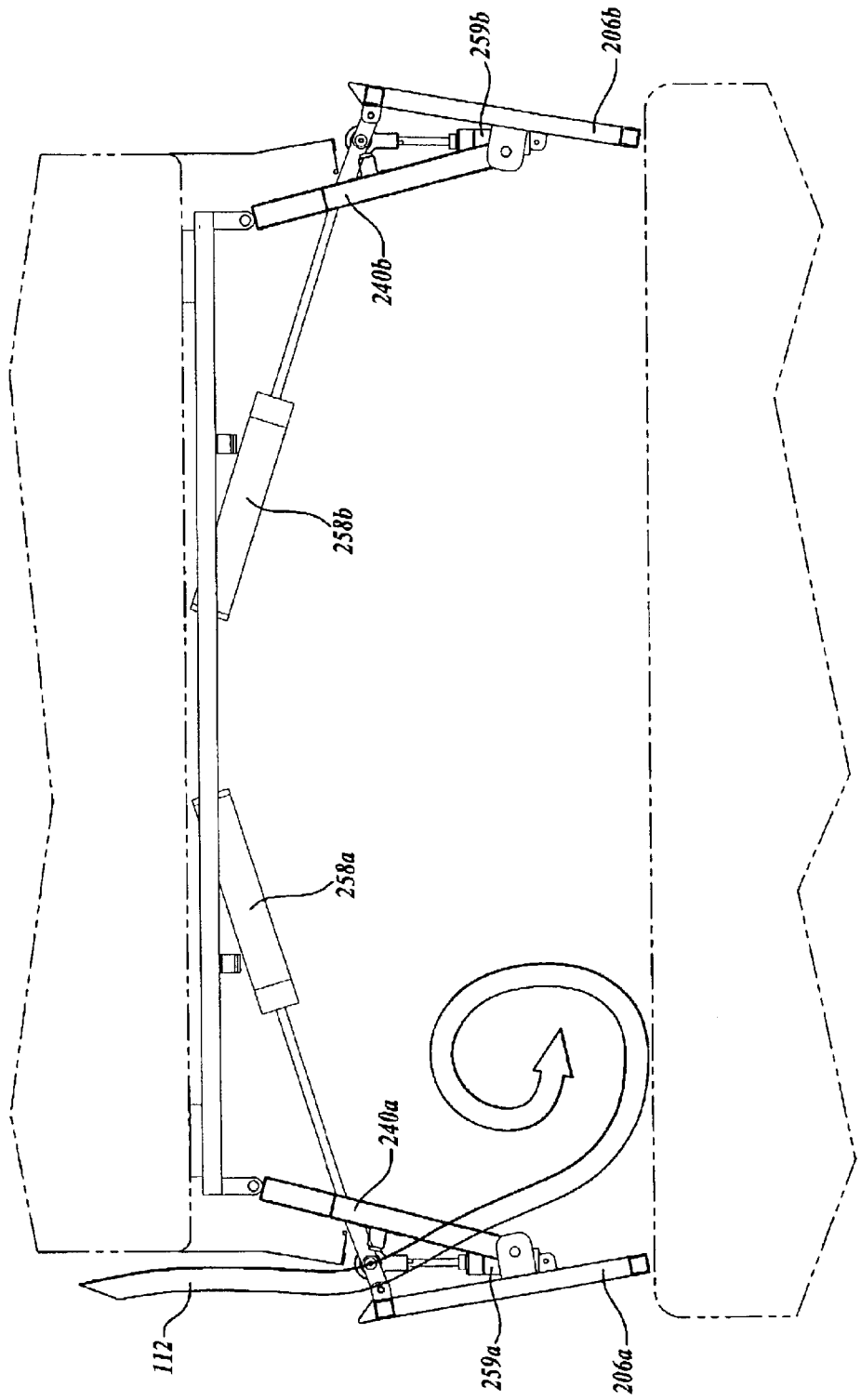
FIG. 5 is a top view of the cab extender assembly and vehicle depicted in FIG. 1 wherein the first and second dynamic cab extenders are each depicted in the braking position.

Referring to FIGS. 1 and 2 and generally described, the cab extender assembly 200 permits the selective manipulation of the aerodynamic drag of the vehicle 100. The cab extender assembly 200 includes a pair of cab extender systems 202a and 202b, each one having a fixed cab extender 204 and a dynamic cab extender 206. The fixed and dynamic cab extenders 204 and 206 are disposed along a side of the vehicle 100 in a gap 106 extending between a back end 108 of the tractor 102 and a front end 110 of the trailer 104. A control system 208 selectively positions the dynamic cab extenders 206 between a stowed position as shown in FIG. 3, a deployed position as shown in FIG. 4, and a braking position as shown in FIG. 5.

Figure 3:
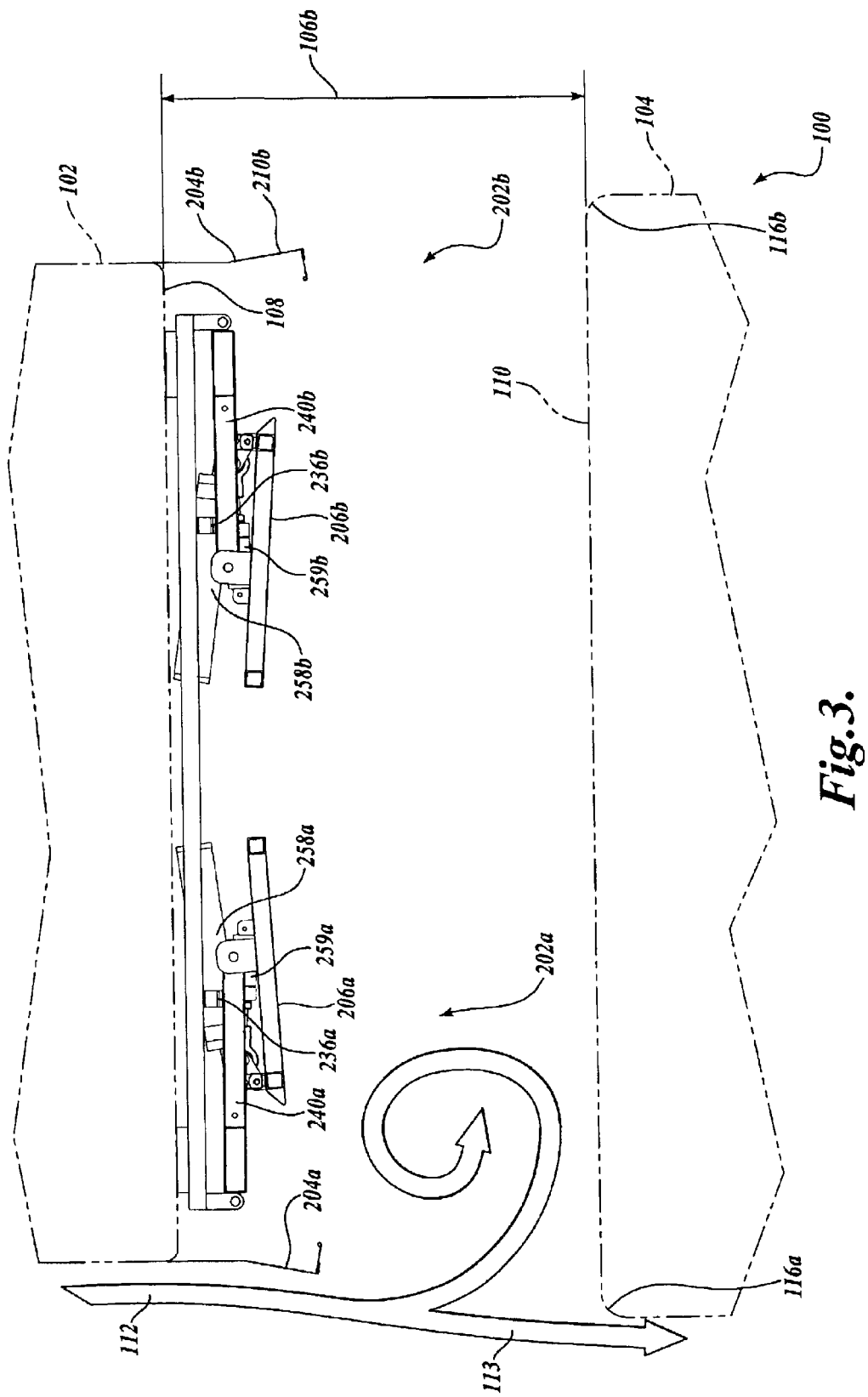
FIG. 3 is a top view of the cab extender assembly and vehicle depicted in FIG. 1 wherein the first and second dynamic cab extenders are each depicted in the stowed position.

More specifically, during low speed operations of the vehicle 100, the dynamic cab extenders 206 are positioned in the stowed position depicted in FIG. 3 such that the front end 110 of the trailer 104 does not impact the dynamic cab extenders 206 during turns. During high speed operations of the vehicle 100, where the vehicle is restricted from making large turns due to the speed of the vehicle 100, the dynamic cab extenders 206 are actuated into the deployed position depicted in FIG. 4 to increase the aerodynamic efficiency of the vehicle 100. During a braking event, the dynamic cab extenders 206 are actuated so that at least a portion of the dynamic cab extenders 206 extend into a slipstream 112 passing along the sides of the vehicle 100 to selectively decrease the aerodynamic efficiency of the vehicle 100 to decrease a stopping distance of the vehicle 100.

The detailed description will now focus upon the cab extender systems 202. In the preferred embodiment illustrated in FIGS. 1-8, the elements of the left and right extenders systems 202a and 202b are mirror images of one another. Therefore, where context permits, reference in the following description to an element of one of the left or right cab extender systems 202a or 202b shall also be understood as also referring to the corresponding element in the other cab extender system. A numbering scheme is used in which a suffix of "a" or "b" may be added to a reference numeral to designate a component associated with the left or right cab extender system 202a and 202b respectively, or the suffix may be omitted to refer to both simultaneously.

Referring to FIGS. 1 and 3, as mentioned above, each cab extender system 202a and 202b includes a fixed cab extender 204 and a dynamic cab extender 206. The fixed cab extenders 204 are coupled to the back end 108 of the vehicle 100 so as to span a portion of the gap 106 extending along the sides of the vehicle 100 between a back end 108 of the tractor 102 and the front end 110 of the trailer 104. The fixed cab extenders 204 are aligned to direct at least a portion 113 of the slipstream 112 passing along the sides of the tractor 102 to the sides of the trailer 104. To this end, an outer planar surface 210 of the fixed cab extender 204 is oriented to direct a portion 113 of the slipstream towards the front corners 116 of the trailer 104 where the front end 110 of the trailer 104 intersects the sides of the trailer 104. Oriented as described, the fixed cab extenders 204 are oriented substantially parallel with a longitudinal axis of the vehicle 100.

The fixed cab extenders 204 are of a selected length preferably selected to permit the tractor 102 to pivot about the trailer 104 a selected angular range without the front end of the trailer 104 contacting the fixed cab extenders 204. The selected angular range is greater than about 45 degrees, and preferably over about 90 degrees. Ideally, the selected angular range is greater than about 180 degrees such that the tractor 102 may pivot 90 degrees to the left or right relative to the trailer without the trailer 104 impacting the fixed cab extenders 204. The fixed cab extenders 204 may be formed from any suitable rigid material, such as steel, aluminum, etc. Preferably, the fixed cab extenders 204 are thin planar members having a selected height substantially equal to the height of the tractor 102 and/or trailer 104.

Figure 6:
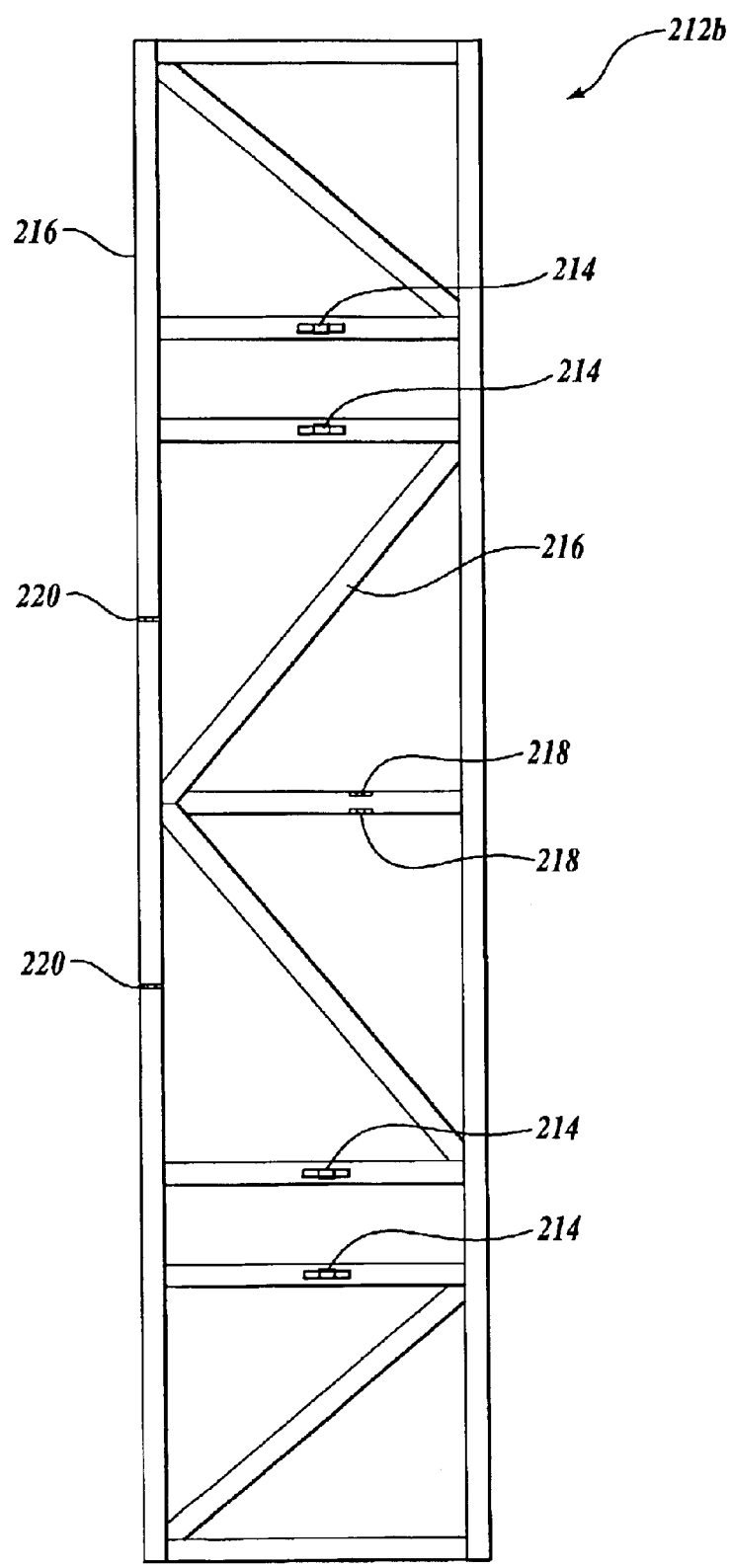
FIG. 6 is an elevation view of an internal frame of the second dynamic cab extender depicted in FIG. 1.

Referring to FIGS. 2 and 6 and as mentioned above, each cab extender system 202a and 202b also includes a dynamic cab extender 206a or 206b. The dynamic cab extenders 206 each include an internal frame 212 formed from a rigid material. The illustrated embodiment uses tubular frame members 216 having a square cross-section and formed of steel or aluminum, one suitable example being 6061-T6 aluminum square tubing. The internal frame 212 includes four deployment arm mounting brackets 214 extending outward from selected tubular frame members 216 to permit the coupling of a deployment arm 240 (best shown in FIG. 8) to the internal frame 212. The internal frame 212 also includes two brake actuator mounting brackets 218 extending outward from selected tubular frame members 216 to permit the coupling of a brake actuator 259 to the internal frame 212. The internal frame 212 additionally includes two linkage assembly mounting brackets 220 extending outward from selected tubular frame members 216 to permit the coupling of a linkage assembly 260 to the internal frame 212. Coupled to the outer and inner sides of the internal frame 212 are sheets of rigid material, such as sheet metal, to form an outer planar surface 222 and an inner planar 224 surface of the dynamic cab extender 206.

Figure 7:
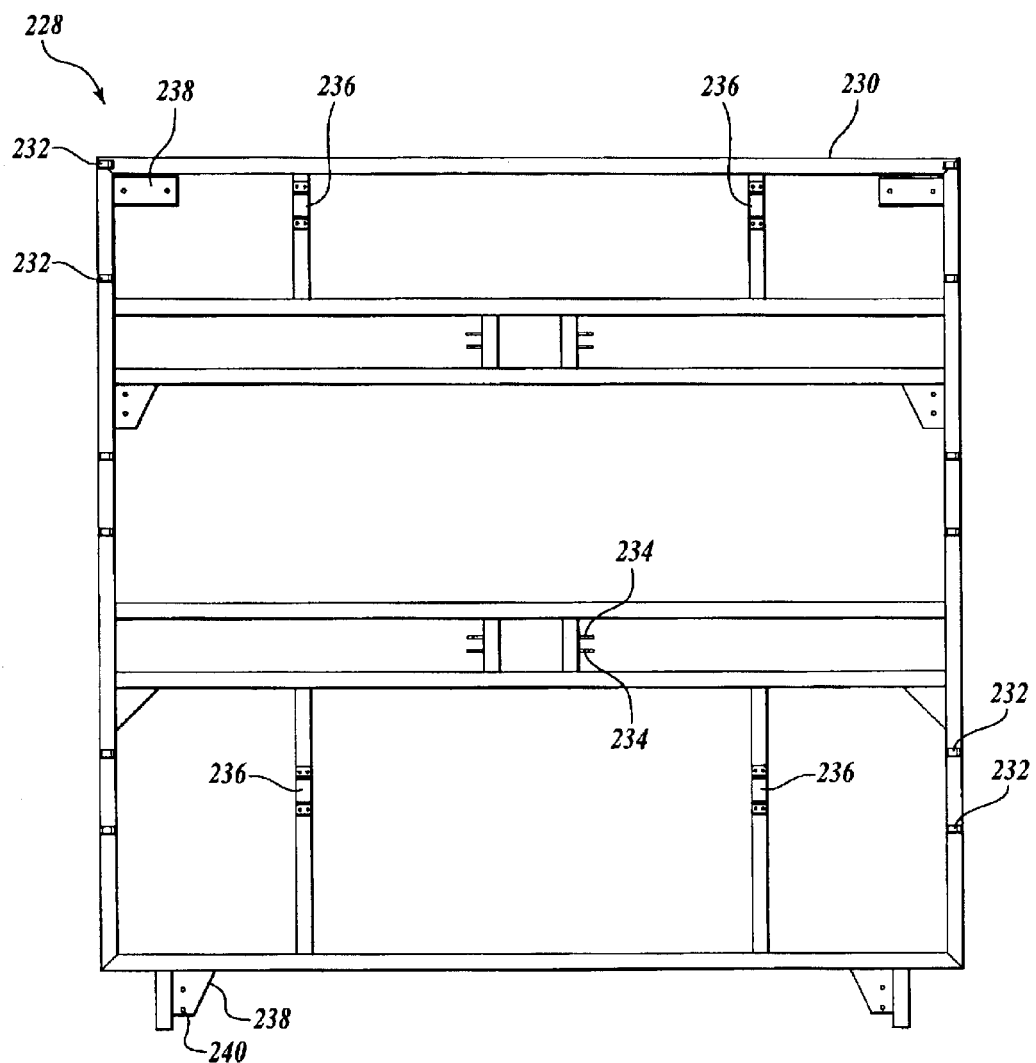
FIG. 7 is an elevation view of a support frame of the cab extender assembly depicted in FIG. 1.

Referring to FIGS. 2 and 7, a support frame 228 is depicted. The support frame 228 permits the coupling of the cab extender assembly 200 to the back end 108 of the tractor 102. The support frame 228 is formed from a rigid material, such as steel or aluminum tubular frame members 230 having a square cross-section, one suitable example being 6061-T6 aluminum square tubing. The support frame 228 includes twelve deployment arm mounting brackets 232 extending outward from selected locations on the tubular frame members 230. The deployment arm mounting brackets 232 permit the coupling of the deployment arms 240 to the support frame 228. The support frame 228 also includes eight deployment actuator mounting brackets 234 extending outward from selected locations on the tubular frame members 230. The deployment actuator mounting brackets 234 permit the coupling of the deployment actuators 258 to the support frame 228.

The support frame 228 additionally includes four bump stops 236 mounted at selected locations upon selected tubular frame members 230. The bump stops 236 are located to engage the deployment arms 240 when the deployment arms 240 are in the stowed position depicted in FIG. 3. The support frame 228 further includes a plurality of mounting plates 238 coupled to selected tubular frame members 230. The mounting plates 238 have a plurality of apertures 240 adapted to receive well known fasteners therethrough to couple the mounting plates 238, and thus the support frame 228, to the back end 108 of the tractor 102.

Referring to FIGS. 1 and 2, this detailed description will now focus upon the control system 208. The control system 208 includes all components utilized in configuring the dynamic cab extenders between the stowed, deployed, and braking positions. The control system 208 of the illustrated embodiment includes the following sub assemblies: deployment arms 240, linkage assemblies 260, deployment actuators 258, braking actuators 259, controller 270, speed sensor 278, a braking sensor 280, and other related components, all of which will be described in further detail following.

Figure 8:
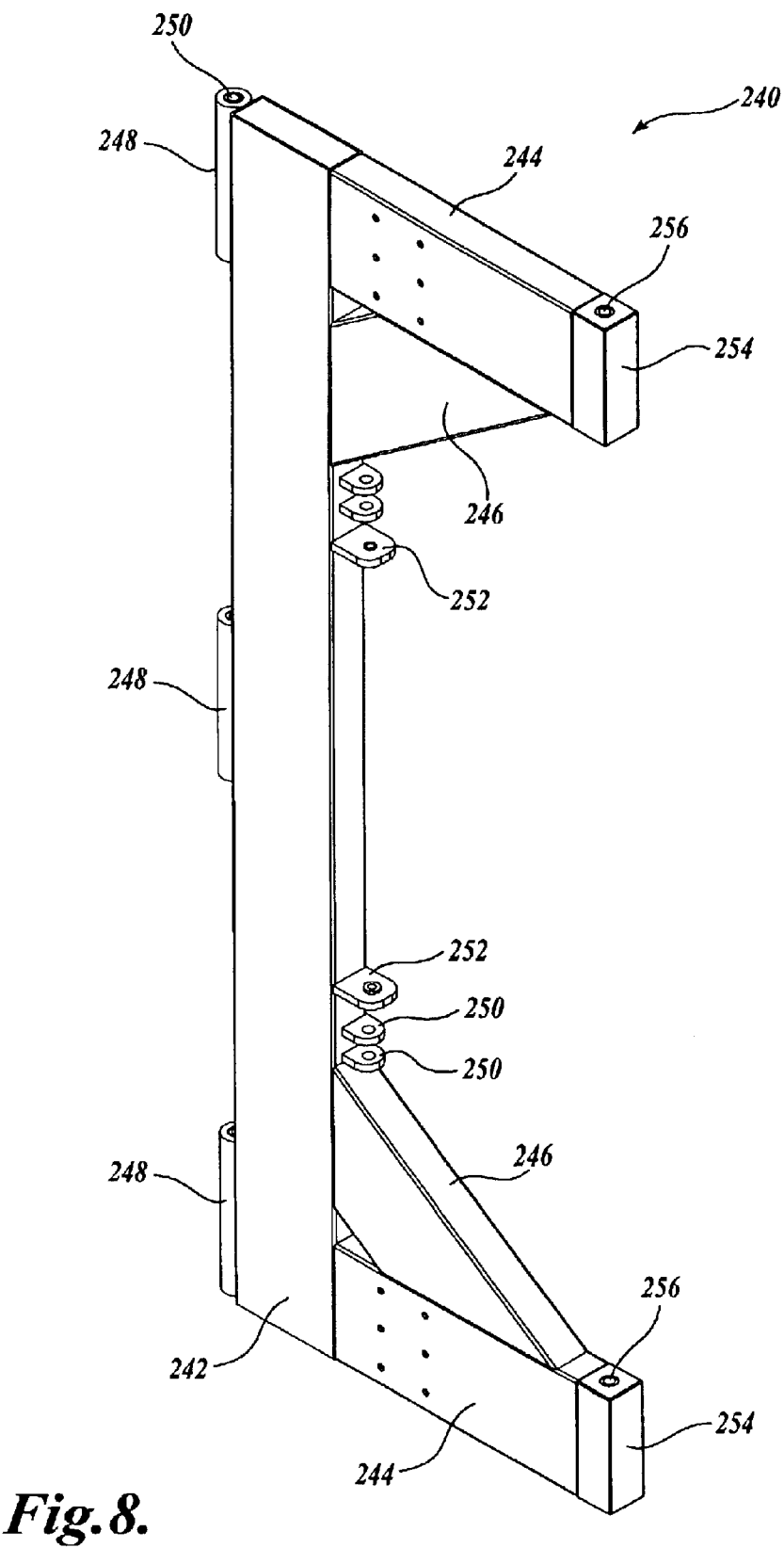
FIG. 8 is an isometric view of a deployment arm depicted in FIG. 1.

Turning to FIGS. 2 and 8, one of the deployment arms 240 is depicted. The deployment arm 240 includes a vertically oriented base member 242. Two horizontally oriented arm members 244 are coupled to the base member 242 and extend perpendicularly outward therefrom. A strengthener 246 extends from each of the arm members 244 to the base member 242 to increase the rigidity and strength of the deployment arm 240. The base member 242, arm members 244, and strengtheners 246 may be formed from a rigid material, such as steel or aluminum tubular frame members having a rectangular cross-section.

Coupled to deployment arm 240 are a series of axle bearings or bushings 248 each having a bore 250 passing through the center of each bushing 248. The bores 250 are sized and configured to rotatingly receive an axle therethrough when the deployment arm 240 is coupled to the support frame 228. Also coupled to the deployment arm 240 are four deployment actuator mounting brackets 250 which permit the coupling of the deployment actuators 258 thereto. Additionally coupled to the deployment arm 240 are two linkage assembly mounting brackets 252 which permit the coupling of the linkage assembly 260 thereto. Coupled to each of the distal ends of the arm members 244 is a bushing block 254. The bushing blocks 254 each have a bore 256 passing through the center of each bushing block 254. The bores 256 are sized and configured to rotatingly receive an axle therethrough to permit the deployment arm 240 to be coupled to the dynamic cab extenders 206.

Referring to FIG. 2, the detailed description will now focus upon the linkage assembly 260. The linkage assembly includes an upper linkage group having a first link 262a and a second link 264a and a lower linkage group having a first link 262b and a second link 264b. One end of each of the first links 262 is coupled to the linkage assembly mounting brackets 252 disposed on the deployment arm 240. One end of each of the second links 264 is coupled to the linkage assembly mounting brackets 220 disposed on the dynamic cab extenders 206. The second ends of the first and second links 262 and 264 are coupled to one another at a first location 266a and 266b.

An actuator bar 268 extends vertically between the upper first location 266a and the lower first location 266b. Displacement of the actuator bar 268 in a horizontal direction substantially parallel with the longitudinal axis of the vehicle 100 causes the first links 262 to rotate relative to the second links 264. When the first links 262 rotate clockwise and the second links 264 rotate counterclockwise as viewed from above, the dynamic cab extenders 206 are pivoted about the bores 256 of the bushing blocks 254 of the deployment arms 240 from the braking position to the deployed position. As the links 262 and 264 are rotated in the opposite direction, the dynamic cab extenders are pivoted from the deployed position to the braking position. Of note, when the dynamic cab extenders are in the braking position, the load exerted upon the dynamic cab extenders 206 from the passing slipstream is countered by an equal and opposite force at least partial exerted along the lengths of the first and second links 262 and 264, which are substantially aligned. Thus, the load exerted upon the dynamic cab extender 206 when in the braking position is absorbed by the aligned first and second links 262 and 264 of the linkage assembly 260 and the deployment arm 140, and not by the braking actuator 259.

Still referring to FIG. 2, this detailed description will now focus upon the deployment actuators 258 and brake actuators 259 of the control system 208. The actuators 258 and 259 may be of any known or to be developed actuators, some suitable examples being electrical, hydraulic, magnetic, or pneumatic actuators. The actuators 258 and 259 of the illustrated embodiment are double acting pneumatic actuators. The actuators 258 and 259 are positionable in either a fully retracted or fully extended configuration, although it should be apparent to those skilled in the art that actuators selectively actuatable in positions therebetween are suitable for use with and within the spirit and scope of the present invention.

The deployment actuators 258 are disposed between the deployment actuator mounting brackets 214 and 250 disposed on the support frame 228 and the deployment arm 240 respectively. The deployment actuators 258 are selectably adjustable in length. By selecting the length of the deployment actuators 258, the deployment arm 240 is selectively pivoted about the bushings 248 coupled to the deployment arm 240. By increasing the length of the deployment actuators 258 into their fully extended configurations, the dynamic cab extenders 206 are positioned from their stowed positions to the their deployed positions. By decreasing the length of the deployment actuators 258 into their fully retracted configurations, the dynamic cab extenders 206 are positioned from their deployed positions to their retracted positions.

The brake actuators 259 are disposed between the brake actuator mounting brackets 218 disposed on the dynamic cab extenders 206 and the actuator bar 268 on the linkage assembly 260. The brake actuators 259 are selectably adjustable in length. By selecting the length of the brake actuators 259, the dynamic car extenders 206 are pivoted about the bores 256 of the bushing blocks 254 to pivot a leading edge 282 of the dynamic cab extenders 206 into the passing slipstream. By increasing the length of the brake actuators 259 into their fully extended configurations, the dynamic cab extenders 206 are positioned from their deployed positions to the their braking positions. By decreasing the length of the brake actuators 259 into their fully retracted configurations, the dynamic cab extenders 206 are positioned from their braking positions to their deployed positions Referring to FIGS. 1 and 2, the controller 270 of the control system 208 is shown. The controller 270 is adapted to selectively control air pressure to the actuators 258 and 259. By selectively providing pressurized air to one side of a piston (not shown) disposed in each of the actuators 258 and 259 and bleeding pressurized air on an opposite second side of the piston, the piston may be selectively moved along the length of a piston housing 272. A piston rod 274 coupled to the piston transfers the force exerted upon the piston outside of the piston housing 272. Moving the piston in one direction extends the actuator 258 or 259 to a fully extended position. Moving the piston in a second direction retracts the actuator 258 or 259 into a retracted position, as is well known in the art.

The pressurized air is preferably provided by an onboard air compressor (not shown) of the vehicle 100. In the illustrated embodiment, the pressurized air is received from the air compression system normally used to service the brakes of the vehicle 100. The pressurized air is provided to the controller 270 through an inlet line 275. Pressurized air is delivered and bled from the actuators 258 and 259 from a series of air lines 276 coupled to the ends of each of the actuators 258 and 259. By selectively providing and bleeding pressurized air to the actuators 258 and 259, a selected side of the piston contained in each actuator may be selectively pressurized to cause movement of the piston in a selected direction.

The controller 270 may be coupled in signal communication with a speed sensor 278 and a braking event sensor 280. The speed sensor 278 is adapted to sense a speed of the vehicle and relay the sensed speed to the controller 270. Preferably the speed sensor 278 ties into an existing data bus of the vehicle to obtain vehicle speed data. Alternately, the speed sensor 278 may be an existing original equipment manufacture sensor that comes with the vehicle when purchased or may be later installed. The braking event sensor 280 is adapted to determine if a braking event has occurred, such as the pressing of a brake pedal (not shown) by the operator of the tractor 102. Preferably the braking event sensor 280 ties into the existing data bus of the vehicle to obtain braking event data.

Still referring to FIGS. 1 and 2, in light of the above description of the components of the cab extender assembly 200, the operation of the cab extender assembly 200 will now be described. During low speed operations of the vehicle 100, the dynamic cab extenders 206 are positioned in the stowed position depicted in FIG. 3 such that the front end 110 of the trailer 104 does not impact the dynamic cab extenders 206 during turns. The configuration of the dynamic cab extenders 206 in the stowed position is accomplished by the control system 208. When the speed sensor 278 senses a speed of the vehicle below a selected speed, such as 45 mph, the controller 270 selectively pressurizes and bleeds air from the deployment actuators 258 to configure the deployment actuators 258 in their fully retracted positions. As is apparent to those skilled in the art and others, by placing the deployment actuators 258 in their fully retracted positions, the deployment arms 240 and attached dynamic cab extenders 206 are swung inward to the stowed positions. In the stowed position, the cab extenders are oriented such that their outer surfaces 222 are oriented substantially perpendicular to the longitudinal axis of the vehicle 100. In the stowed position, the dynamic cab extenders 206 are disposed adjacent the back end 108 of the tractor 102 of the vehicle 100.

During high speed operations of the vehicle 100, where the vehicle is restricted from turning, the dynamic cab extenders 206 are actuated into the deployed positions depicted in FIG. 4 to increase the aerodynamic properties of the vehicle 100. During a braking event, the dynamic cab extenders 206 are actuated so that at least a portion of the dynamic cab extenders 206 extend into the slipstream 112 passing along the sides of the vehicle 100 to selectively decrease the aerodynamic efficiency of the vehicle 100 and to decrease a stopping distance of the vehicle 100.

Figure 9:
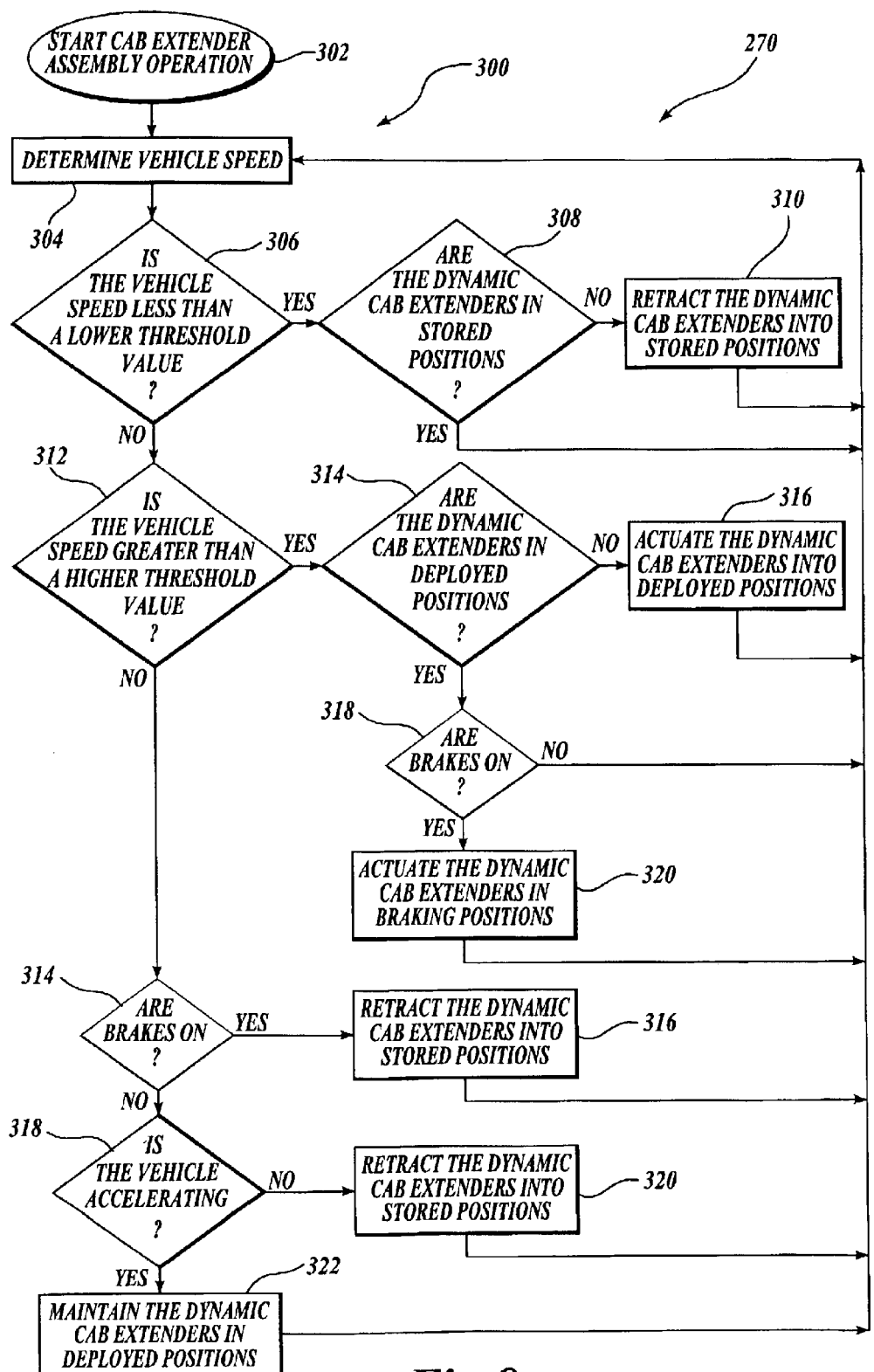
FIG. 9 is a functional flow diagram illustrating processing performed by a controller in controlling the function of the cab extender assembly.

Turning to FIG. 9, the operation of the cab extender assembly will now be more fully described by examining the control logic of the controller 270. FIG. 9 is a functional flow diagram illustrating processing performed by the controller 270 in controlling the function of the cab extender assembly 200. As will be better understood from the following description, the controller 270 is used to automatically configure the dynamic cab extenders between their stowed, deployed, and braking positions. Since electronic controls and computer system operable to perform the functions described in relation to FIG. 9 are well known, no specific hardware for performing the described functions is described herein.

The cab extender assembly control logic routine 300 begins at block 302 and proceeds to block 304, where the speed of the vehicle is determined, preferably from extracting the speed of the vehicle from the data bus of the vehicle. The speed of the vehicle is input into decision block 306. If the speed of the vehicle is less than a lower threshold value, such as 45 mph, then the routine proceeds to decision block 308. At decision block 308 it is determined if the dynamic cab extenders are in stowed positions. If the dynamic cab extenders are in stowed positions, then the routine returns to block 304. If the dynamic cab extenders are not in stowed positions, then the routine proceeds from decision block 308 to block 310, wherein the dynamic cab extenders are actuated into stowed positions to permit the vehicle to perform sharp turns. The routine then returns to block 304.

Returning to decision block 306, if the vehicle speed is greater than a lower threshold value, the routine proceeds to block 312. At decision block 312, it is determined if the vehicle speed is greater than a higher threshold value, such as 50 mph. If the vehicle speed is greater than a higher threshold value, then the routine proceeds to decision block 314. At decision block 314 it is determined if the dynamic cab extenders are in deployed positions. If it is determined the dynamic cab extenders are not in deployed positions, then the routine proceeds to block 316, wherein the dynamic cab extenders are actuated into deployed positions. The routine then returns to block 304.

Returning to decision block 314, if the dynamic cab extenders are in a deployed position, the routine proceeds to decision block 318. At decision block 318 it is determined if the brakes are on. If the brakes are not on, then the routine returns to block 304. If the brakes are on, the routine proceeds to block 320, wherein the dynamic cab extenders are actuated into braking positions. Once the dynamic cab extenders are actuated into braking positions, the routine returns to block 304.

Returning to decision block 312, if the vehicle speed is not greater than a higher threshold value, such as 50 mph, then the routine proceeds to decision block 314. Since to reach decision block 314, the routine has passed through decision blocks 306 and 312, the speed of the vehicle is between the lower and higher threshold values, such as between 45 and 50 mph. At decision block 314, it is determined if the brakes are on. If the brakes are on, then the routine proceeds to block 316 wherein the dynamic cab extenders are retracted into stowed positions. The routine then proceeds to block 304.

Returning to decision block 314, if the brakes are not on, then the routine proceeds to decision block 318. At decision block 318 it is determined if the vehicle is accelerating. If the vehicle is not accelerating, the routine proceeds to block 320 wherein the dynamic cab extenders are retracted into stowed positions. The routine then proceeds to block 304 after retraction of the dynamic cab extenders into stowed positions. Returning to decision block 318, if it is determined that the vehicle is accelerating, the routine proceeds to block 322 wherein the dynamic cab extenders are maintained in their deployed position, if currently in a deployed position. The routine then returns to block 304. The control logic routine 300 continues in an endless loop in the manner described above until shutdown.

Although specific examples of lower threshold and higher threshold values are mentioned above, it should be apparent to those skilled in the art that the figures given are illustrative only. It should be apparent to those skilled in the art that alternate lower and higher threshold values are suitable for use with the present invention and are within the spirit and scope of the present invention.

For the purposes of this detailed description, the term "substantially" when referencing a reference direction, such as a "substantially aligned," "substantially parallel," "substantially perpendicular," "substantially along a side," "substantially coplanar," etc. shall be defined as an orientation that varies less than 45 degrees from the indicated reference direction. For instance, the term "substantially parallel" indicates that the inclination of the item in question deviates less than 45 degrees from a parallel orientation.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A cab extender assembly for selectively manipulating an aerodynamic drag of a vehicle comprising:
    (a) a dynamic cab extender; and
    (b) a control system coupled to the dynamic cab extender and adapted to selectively position the dynamic cab extender between a stowed position in which the dynamic cab extender is disposed out of an airstream passing along a side of the vehicle and inclined relative to the side of the vehicle, a deployed position in which the dynamic cab extender is substantially aligned with the side of the vehicle, and a braking position in which the dynamic cab extender is at least partially disposed into the airstream passing along the side of the vehicle to increase a drag coefficient of the vehicle.

2. The cab extender assembly of claim 1, wherein the dynamic cab extender includes a leading edge and when the dynamic cab extender is in the braking position, the leading edge is disposed in the airstream to direct a portion of the airstream to impact the vehicle.

3. The cab extender assembly of claim 1 further comprising a linkage assembly adapted to couple to the vehicle and coupled to the dynamic cab extender, the linkage assembly configurable into a first position in which the dynamic cab extender is actuated into the braking position and a second position in which the dynamic cab extender is actuated into the deployed position.

4. The cab extender assembly of claim 3, further comprising a braking actuator coupled to the linkage assembly to selectively actuate the linkage assembly between the first and second positions, wherein when the dynamic cab extender is in the braking position, a load exerted by the airstream upon the dynamic cab extender is transferred through the linkage assembly to the vehicle.

5. The cab extender assembly of claim 4, wherein when the dynamic cab extender is in the braking position, the load exerted by the airstream upon the dynamic cab extender is not born by the braking actuator.

6. The cab extender assembly of claim 4, wherein an axis of movement of the braking actuator is oriented substantially parallel with the side of the vehicle.

7. The cab extender assembly of claim 1, wherein the control system further includes a deployment arm adapted to be pivotally coupled to the vehicle and pivotally coupled to the dynamic cab extender, and wherein the deployment arm may be selectively pivoted to selectively position the dynamic cab extender between the deployed and stowed positions.

8. The cab extender assembly of claim 7 further comprising a linkage assembly coupled to the deployment arm and the dynamic cab extender, the linkage assembly configurable into a first position in which the dynamic cab extender is actuated into the braking position and a second position in which the dynamic cab extender is actuated into the deployed position.

9. The cab extender assembly of claim 1, wherein the control system further includes a speed sensor adapted to sense a speed of the vehicle and wherein the control system is adapted to automatically configure the dynamic cab extender into the deployed position when the speed exceeds a selected speed.

10. The cab extender assembly of claim 1, wherein the control system further includes a speed sensor adapted to sense a speed of the vehicle and wherein the control system is adapted to automatically configure the dynamic cab extender into the stowed position when the speed is less than a predetermined speed.

11. The cab extender assembly of claim 1, wherein the control system includes a braking event sensor adapted to determine the presence of a braking event and wherein the control system is adapted to selectively actuate the dynamic cab extender into the braking position when the braking event sensor determines the presence of a braking event.

12. The cab extender assembly of claim 1 further including a fixed cab extender adapted to be coupled to the vehicle so as to span a portion of a gap extending along the side of the vehicle between a back end of a tractor and a front end of a trailer of the vehicle, wherein the fixed cab extender is adapted to substantially align in the gap with the dynamic cab extender when the dynamic cab extender is in the deployed position.

13. The cab extender assembly of claim 12, wherein the fixed cab extender has a selected length chosen to permit the tractor to pivot about the trailer a selected angular range without the front end of the trailer contacting the fixed cab extender.

14. The cab extender assembly of claim 13, wherein the selected angular range is greater than about 90 degrees.

15. The cab extender assembly of claim 1, wherein when the dynamic cab extender is in the stowed position, the dynamic cab extender is substantially perpendicularly oriented with a longitudinal axis of the vehicle.

16. The cab extender assembly of claim 1, wherein when the dynamic cab extender is in the stowed position, the dynamic cab extender is disposed adjacent a back end of a tractor of the vehicle.

17. A cab extender assembly for selectively manipulating an aerodynamic drag of a vehicle including a tractor coupled to a trailer, the cab extender assembly comprising:
 (a) a fixed cab extender panel adapted to couple to the tractor so to extend longitudinally outward from a back end of the tractor along a side of the vehicle a selected distance in a gap extending substantially between the back end of the tractor and a front end of the trailer;
 (b) a dynamic cab extender coupled to the tractor; and
 (c) a control system coupled to the dynamic cab extender and adapted to selectively position the dynamic cab extender between a stowed position and a deployed position in which the dynamic cab extender is disposed in the gap so as to be substantially coplanar with the fixed cab extender.

18. The cab extender assembly of claim 17, wherein the selected distance that the fixed cab extender panel extends in the gap is chosen to permit the tractor to pivot about the trailer a selected angular range without the front end of the trailer contacting the fixed cab extender panel.

19. The cab extender assembly of claim 18, wherein the selected angular range is greater than about 90 degrees.

20. The cab extender assembly of claim 17, wherein the control system is operable to selectively position the dynamic cab extender between the deployed position and a braking position in which the dynamic cab extender is at least partially disposed into an airstream passing along the side of the vehicle to increase a drag coefficient of the vehicle.

21. A cab extender assembly for selectively manipulating an aerodynamic drag of a vehicle including a tractor coupled to a trailer, the cab extender assembly comprising:
 (a) a fixed cab extender adapted to couple to the tractor so as to extend longitudinally outward from a back end of the tractor along a side of the vehicle a selected distance in a gap extending substantially between the back end of the tractor and a front end of the trailer;
 (b) a dynamic cab extender adapted to couple to the tractor; and
 (c) a control system coupled to the dynamic cab extender and operable to selectively position the dynamic cab extender between a deployed position in which the dynamic cab extender is disposed in the gap and substantially coplanar with the fixed cab extender and a braking position in which the dynamic cab extender is at least partially disposed into an airstream passing along the side of the vehicle to increase a drag coefficient of the vehicle.

22. The cab extender assembly of claim 21, wherein the selected distance that the fixed cab extender extends in the gap is chosen to permit the tractor to pivot about the trailer a selected angular range without the front end of the trailer contacting the fixed cab extender.

23. The cab extender assembly of claim 22, wherein the selected angular range is greater than about 90 degrees.

24. The cab extender assembly of claim 21, wherein the control system is adapted to selectively position the dynamic cab extender between a stowed position and the deployed position.

25. The cab extender assembly of claim 24, wherein when the dynamic cab extender is in the stowed position, the dynamic cab extender is substantially perpendicularly oriented relative to a longitudinal axis of the vehicle.

26. A method of selectively manipulating an aerodynamic drag of a vehicle having a dynamic cab extender disposed in a gap located along a side of the vehicle between a tractor and a trailer of the vehicle, the method comprising:
 (a) determining a speed of the vehicle;
 (b) automatically deploying the dynamic cab extender into a deployed position in the gap when the speed of the vehicle exceeds a selected speed; and
 (c) automatically stowing the dynamic cab extender in a stowed position in which the dynamic cab extender is disposed out of an airstream passing along the side of the vehicle and inclined relative to the side of the vehicle when the speed of the vehicle is less than a predetermined speed.

27. The method of claim 26, further including:
 (a) sensing a braking condition; and
 (b) responding to the braking condition by actuating the dynamic cab extender into a braking position by displacing at least a portion of the dynamic cab extender into a passing slipstream to increase a drag coefficient of the vehicle to reduce a stopping distance of the vehicle.

28. The method of claim 27, further comprising restricting the deployment of the dynamic cab extender into the braking position to instances when the speed of the vehicle exceeds a selected upper threshold speed.

29. The method of claim 26, wherein stowing the dynamic cab extender includes displacing the dynamic cab extender towards a back of the tractor.

30. A cab extender assembly for selectively manipulating an aerodynamic drag of a vehicle comprising:
 (a) a dynamic cab extender;
 (b) a control system coupled to the dynamic cab extender and adapted to selectively position the dynamic cab extender between a stowed position, a deployed position in which the dynamic cab extender is substantially aligned with a side of the vehicle, and a braking position in which the dynamic cab extender is at least partially disposed into an airstream passing along the side of the vehicle to increase a drag coefficient of the vehicle;

(c) a linkage assembly adapted to couple to the vehicle and coupled to the dynamic cab extender, the linkage assembly configurable into a first position in which the dynamic cab extender is actuated into the braking position and a second position in which the dynamic cab extender is actuated into the deployed position; and (d) a braking actuator coupled to the linkage assembly to selectively actuate the linkage assembly between the first and second positions, wherein when the dynamic cab extender is in the braking position, a load exerted by a slipstream upon the dynamic cab extender is transferred through the linkage assembly to the vehicle, wherein when the dynamic cab extender is in the braking position, the load exerted by the slipstream upon the dynamic cab extender is not born by the braking actuator.

31. A cab extender assembly for selectively manipulating an aerodynamic drag of a vehicle comprising:

(a) a dynamic cab extender;

(b) a control system coupled to the dynamic cab extender and adapted to selectively position the dynamic cab extender between a stowed position, a deployed position in which the dynamic cab extender is substantially aligned with a side of the vehicle, and a braking position in which the dynamic cab extender is at least partially disposed into an airstreani passing along the side of the vehicle to increase a drag coefficient of the vehicle;

(c) a linkage assembly adapted to couple to the vehicle and coupled to the dynamic cab extender, the linkage assembly configurable into a first position in which the dynamic cab extender is actuated into the braking position and a second position in which the dynamic cab extender is actuated into the deployed position; and (d) a braking actuator coupled to the linkage assembly to selectively actuate the linkage assembly between the first and second positions, wherein when the dynamic cab extender is in the braking position, a load exerted by a slipstream upon the dynamic cab extender is transferred through the linkage assembly to the vehicle, wherein an axis of movement of the braking actuator is oriented substantially parallel with the side of the vehicle.

32. A cab extender assembly for selectively manipulating an aerodynamic drag of a vehicle comprising:

(a) a dynamic cab extender;

(b) a control system coupled to the dynamic cab extender and adapted to selectively position the dynamic cab extender between a stowed position, a deployed position in which the dynamic cab extender is substantially aligned with a side of the vehicle, and a braking position in which the dynamic cab extender is at least partially disposed into an airstream passing along the side of the vehicle to increase a drag coefficient of the vehicle; and (c) a fixed cab extender adapted to be coupled to the vehicle so as to span a portion of a gap extending along a side of the vehicle between a back end of a tractor and a front end of a trailer of the vehicle, wherein the fixed cab extender is adapted to substantially align in the gap with the dynamic cab extender when the dynamic cab extender is in the deployed position; wherein the fixed cab extender has a selected length chosen to permit the tractor to pivot about the trailer a selected angular range greater than about 90 degrees without the front end of the trailer contacting the fixed cab extender.

33. A cab extender assembly for selectively manipulating an aerodynamic drag of a vehicle comprising:

(a) a dynamic cab extender; and (b) a control system coupled to the dynamic cab extender and adapted to selectively position the dynamic cab extender between a stowed position, a deployed position in which the dynamic cab extender is substantially aligned with a side of the vehicle, and a braking position in which the dynamic cab extender is at least partially disposed into an airstream passing along the side of the vehicle to increase a drag coefficient of the vehicle; and wherein when the dynamic cab extender is in the stowed position, the dynamic cab extender is substantially perpendicularly oriented with a longitudinal axis of the vehicle.

34. A cab extender assembly for selectively manipulating an aerodynamic drag of a vehicle including a tractor coupled to a trailer, the cab extender assembly comprising:

(a) a fixed cab extender adapted to couple to the tractor so to extend longitudinally a selected distance in a gap extending substantially along a side of the vehicle between a back end of the tractor and a front end of the trailer;

(b) a dynamic cab extender coupled to the tractor; and (c) a control system coupled to the dynamic cab extender and adapted to selectively position the dynamic cab extender between a stowed position and a deployed position in which the dynamic cab extender is disposed in the gap so as to be substantially coplanar with the fixed cab extender, wherein the selected distance that the fixed cab extender extends in the gap is chosen to permit the tractor to pivot about the trailer a selected angular range greater than about 90 degrees without the front end of the trailer contacting the fixed cab extender.

35. A cab extender assembly for selectively manipulating an aerodynamic drag of a vehicle including a tractor coupled to a trailer, the cab extender assembly comprising:

(a) a fixed cab extender adapted to couple to the tractor so as to extend longitudinally a selected distance in a gap extending substantially along a side of the vehicle between a back end of the tractor and a front end of the trailer;

(b) a dynamic cab extender adapted to couple to the tractor; and (c) a control system coupled to the dynamic cab extender and operable to selectively position the dynamic cab extender between a deployed position in which the dynamic cab extender is disposed in the gap and substantially coplanar with the fixed cab extender and a braking position in which the dynamic cab extender is at least partially disposed into an airstream passing along the side of the vehicle to increase a drag coefficient of the vehicle; wherein the selected distance that the fixed cab extender extends in the gap is chosen to permit the tractor to pivot about the trailer a selected angular range greater than about 90 degrees without the front end of the trailer contacting the fixed cab extender.

36. A cab extender assembly for selectively manipulating an aerodynamic drag of a vehicle including a tractor coupled to a trailer, the cab extender assembly comprising:

(a) a fixed cab extender adapted to couple to the tractor so as to extend longitudinally a selected distance in a gap extending substantially along a side of the vehicle between a back end of the tractor and a front end of the trailer;

(b) a dynamic cab extender adapted to couple to the tractor; and (c) a control system coupled to the dynamic cab extender and operable to selectively position the dynamic cab extender between a deployed position in which the dynamic cab extender is disposed in the gap and substantially coplanar with the fixed cab extender and a braking position in which the dynamic cab extender is at least partially disposed into an airstream passing along the side of the vehicle to increase a drag coefficient of the vehicle, wherein the control system is adapted to selectively position the dynamic cab extender between a stowed position and the deployed position, and wherein when the dynamic cab extender is in the stowed position, the dynamic cab extender is substantially perpendicularly oriented relative to a longitudinal axis of the vehicle.

* * * * *

UNITED STATES PATENT AND TRADEMARK OFFICE
CERTIFICATE OF CORRECTION

PATENT NO. : 6,886,882 B2
DATED : May 3, 2005
INVENTOR(S) : J.R. Farlow et al.

It is certified that error appears in the above-identified patent and that said Letters Patent is hereby corrected as shown below:

Title page,
Item [56], References Cited, OTHER PUBLICATIONS, insert in appropriate order
-- Society of Automotive Engineers, *Recommended Practice for a Serial Control and Communications Vehicle Network, J1939*, issued Nov. 1996, revised Aug. 1997. --.

Column 13,
Line 31, "airstreani" should read -- airstream --.

Signed and Sealed this

Twenty-third Day of August, 2005

JON W. DUDAS
*Director of the United States Patent and Trademark Office*